(12) United States Patent
Takushima et al.

(10) Patent No.: US 6,927,913 B2
(45) Date of Patent: Aug. 9, 2005

(54) OPTICAL SIGNAL PROCESSING APPARATUS

(75) Inventors: Michiko Takushima, Yokohama (JP); Tomomi Sano, Yokohama (JP); Hiroshi Suganuma, Yokohama (JP); Tatsuhiko Tanaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 168 days.

(21) Appl. No.: 10/417,251

(22) Filed: Apr. 17, 2003

(65) Prior Publication Data

US 2003/0197935 A1 Oct. 23, 2003

(30) Foreign Application Priority Data

Apr. 17, 2002 (JP) .................................... P2002-115057

(51) Int. Cl.[7] .............................. G02B 27/44; G02B 5/18
(52) U.S. Cl. ...................... 359/566; 359/494; 359/495; 359/484; 385/11; 385/24; 385/37
(58) Field of Search ................................ 359/494–497, 359/484, 566, 571; 385/11, 24

(56) References Cited

U.S. PATENT DOCUMENTS 6,553,160 B2 * 4/2003 Cao ............................ 385/24

2003/0002791 A1 * 1/2003 Cao ............................ 385/37
2004/0156581 A1 * 8/2004 Golub et al. .................. 385/18
2004/0190822 A1 * 9/2004 Yamamoto et al. ........... 385/24

FOREIGN PATENT DOCUMENTS

JP  06-300937  10/1994

* cited by examiner

*Primary Examiner*—Leonidas Boutsikaris
(74) *Attorney, Agent, or Firm*—McDermott Will & Emery LLP

(57) ABSTRACT

An optical signal processing apparatus has a diffraction grating element, first condenser lens, Faraday rotation elements, polarization beam splitter, $\lambda/2$ plate, second condenser lens, third condenser lens, and diffraction grating element. The magnitude of a magnetic field of each of the Faraday rotation elements is controlled on the basis of an externally input control signal. The rotation angle of the plane of polarization of signal light is set to 0 or $\lambda/2$ in accordance with the magnitude of the magnetic field. Each Faraday rotation element receives signal light having wavelengths $\lambda_1$ to $\lambda_4$, which has arrived from the first condenser lens, and outputs the signal light as a polarized light component in the first azimuth (parallel to the z-axis direction) or second azimuth (parallel to the y-axis direction).

25 Claims, 9 Drawing Sheets

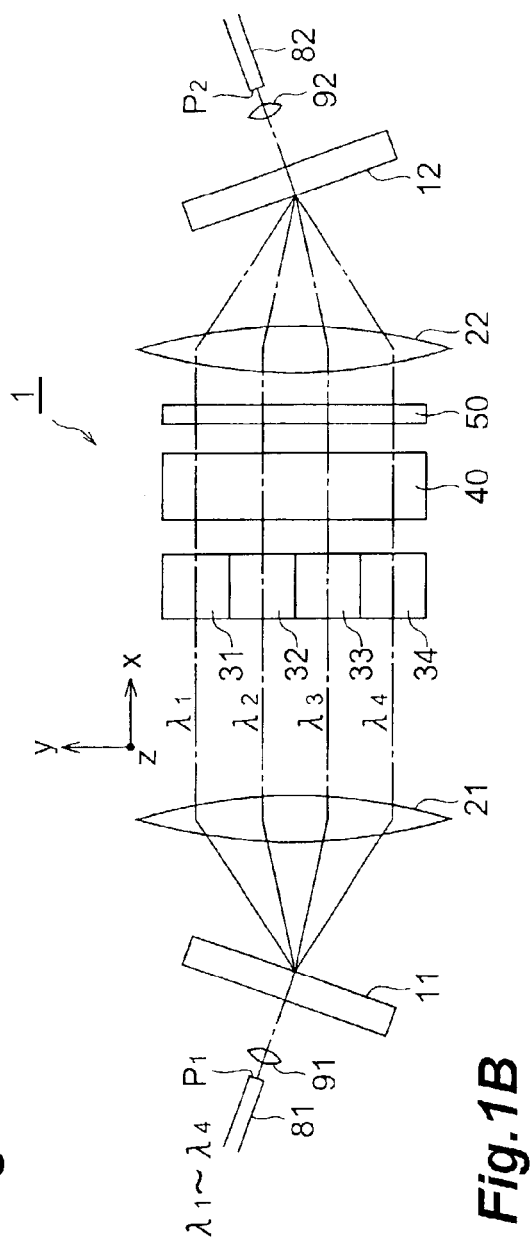
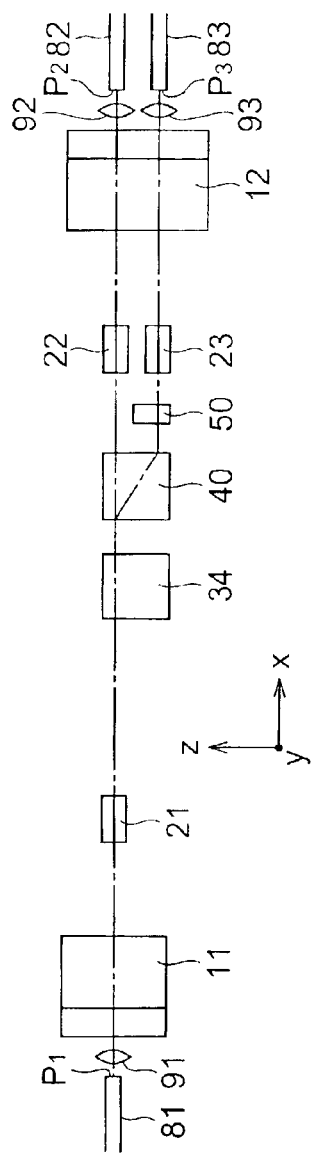
Fig.1A
Fig.1B

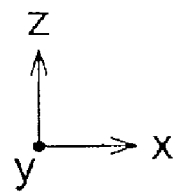
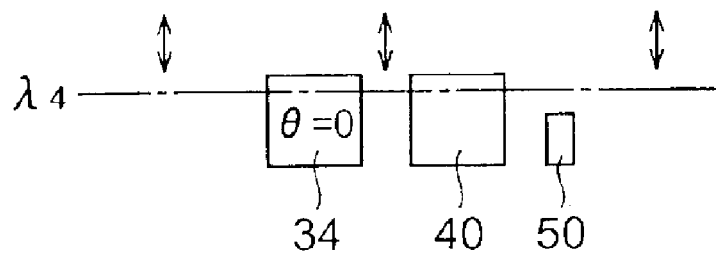
Fig.2A
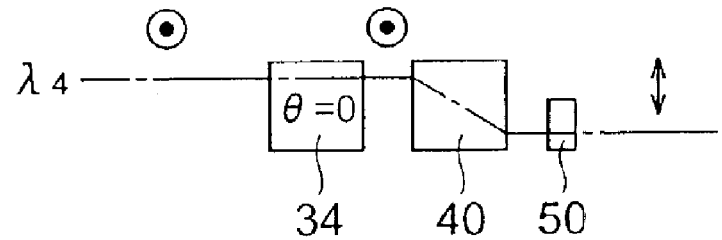
Fig.2B
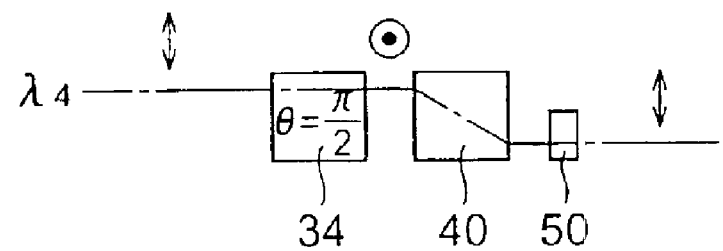
Fig.2C
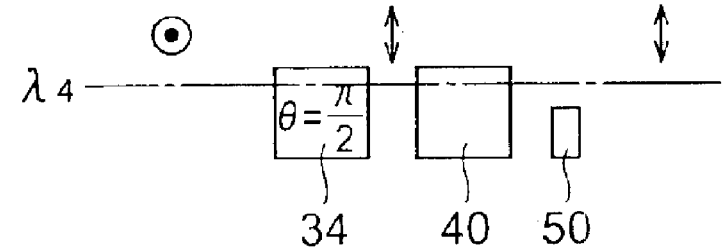
Fig.2D

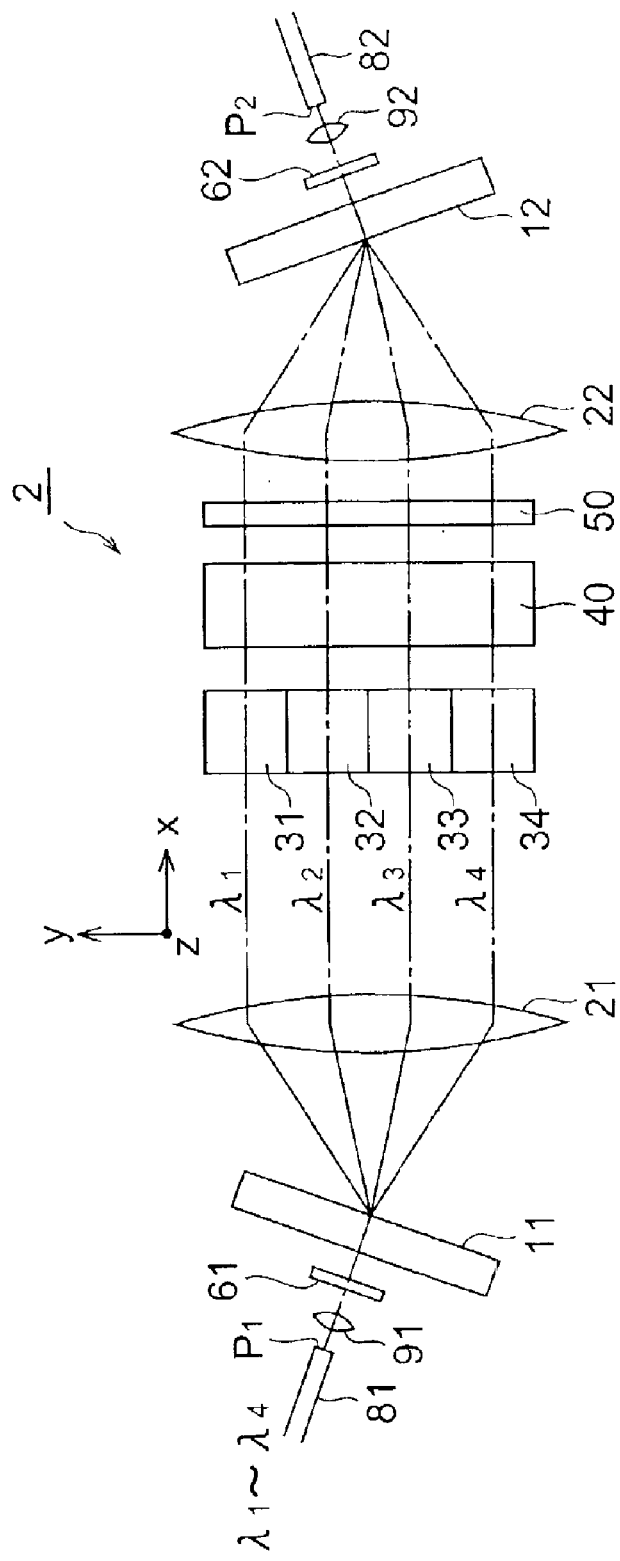

OPTICAL SIGNAL PROCESSING APPARATUS

BACKGROUND OF THE INVENTION

1. Field of the Invention

The present invention relates to an optical signal processing apparatus which multiplexes or demultiplexes signal light with multiple wavelengths.

2. Related Background Art

A diffraction grating element acts as a so-called wavelength branch means. When multiplexed signal light with multiple wavelengths is input to a diffraction grating element, the signal light with multiple wavelengths can be branched into the respective wavelengths. An optical signal processing apparatus using such a wavelength branch means can receive multiplexed signal light with multiple wavelengths, demultiplex it into signal light components of the respective wavelengths or bands, and output the signal light components. Alternatively, the optical signal processing apparatus can multiplex signal light components with multiple wavelengths, which are input for the respective wavelengths or bands, and output multiplexed signal light. The optical signal processing apparatus is used as an optical multiplexer or optical demultiplexer in an optical communication system.

For example, in an optical signal processing apparatus disclosed in Japanese Patent Laid-Open No. 6-300937, multiplexed signal light with multiple wavelengths is made incident on a diffraction grating element, the signal light is wavelength-branched using a fact that the light diffraction angle at the diffraction grating element changes depending on the wavelength, and the wavelength-branched signal light components of the respective wavelengths are output to spatially different optical paths. Of these wavelength-branched signal light components, a signal light component having a specific wavelength is separated from the remaining signal light components which have wavelengths other than the specific wavelength by arranging a reflecting mirror on the optical path of the signal light component with the specific wavelength. In this way, the optical signal processing apparatus can operate as an optical demultiplexer. When light travels in a reverse direction, the optical signal processing apparatus can be used as an optical multiplexer. In the optical signal processing apparatus disclosed in the above prior art, movable reflecting mirrors are arranged in the optical paths of the wavelength-branched signal light components with multiple wavelengths. A reflecting mirror is placed on the optical path of the signal light component having a specific wavelength to be separated while the reflecting mirrors are removed from the optical paths of the remaining signal light components which have wavelengths other than the specific wavelength. With this arrangement, the wavelength of signal light to be demultiplexed or multiplexed is changed.

SUMMARY OF THE INVENTION

However, in the optical signal processing apparatus disclosed in the above prior art, the reflecting mirrors must be mechanically moved to be located on or removed from the optical paths of the signal light components. Depending on the positioning accuracy of the reflecting mirrors, it may be impossible to obtain a desired optical characteristic.

The present invention has been made to solve the above problem, and has as its object to provide an optical signal processing apparatus capable of switching a wavelength to be demultiplexed or multiplexed and having an excellent optical characteristic.

According to the present invention, there is provided an optical signal processing apparatus which outputs from one of second and third ports each of multiple wavelengths $\lambda_1$ to $\lambda_N$ (N is an integer: $2 \leq N$) input from a first port and outputs from the first port signal light components of respective wavelengths input to the second port or third port, comprising (1) first wavelength branch means for receiving signal light with the multiple wavelengths $\lambda_1$ to $\lambda_N$ input from the first port, branching the multi-wavelength signal light into the respective wavelengths, and outputting wavelength-branched signal light components of the respective wavelengths $\lambda_n$ is an integer: $2 \leq n \leq N$) to spatially different optical paths, (2) nth polarization control means for receiving the signal light components with the wavelengths $\lambda_n$ output from the first wavelength branch means, controlling a polarized state of each of the signal light components with the wavelengths $\lambda_n$ on the basis of an externally input control signal, and outputting the signal light components, (3) polarized wave separation means for receiving the signal light components with the wavelengths $\lambda_n$ output from the nth polarization control means and outputting the signal light components with the wavelengths $\lambda_n$ to one of first and second optical paths in accordance with the polarized state of each of the signal light components with the wavelengths $\lambda_n$, (4) second wavelength branch means for receiving the signal light components with the wavelengths $\lambda_n$ output from the polarized wave separation means to the first optical path, multiplexing the signal light components, and outputting the multiplexed signal light from the second port, and (5) third wavelength branch means for receiving the signal light components with the wavelengths $\lambda_n$ output from the polarized wave separation means to the second optical path, multiplexing the signal light components, and outputting the multiplexed signal light from the third port.

According to the optical signal processing apparatus of the present invention, the signal light with the multiple wavelengths $\lambda_1$ to $\lambda_N$, which is input from the first port, is branched into the respective wavelengths by the first wavelength branch means. The wavelength-branched signal light components of the respective wavelengths $\lambda_n$ are output to spatially different optical paths. The signal light components with the wavelengths $\lambda_n$ output from the first wavelength branch means are controlled in their polarized states and output by the nth polarization control means which operates on the basis of an externally input control signal. The signal light components with the wavelengths $\lambda_n$ output from the nth polarization control means are output to one of first and second optical paths in accordance with the polarized states. The signal light components with the wavelengths $\lambda_n$ output from the polarized wave separation means to the first optical path are multiplexed by the second wavelength branch means and output from the second port. The signal light components with the wavelengths $\lambda_n$ output from the polarized wave separation means to the second optical path are multiplexed by the third wavelength branch means and output from the third port.

As described above, the optical signal processing apparatus according to the present invention operates as an optical demultiplexer which outputs from one of the second and third ports each of the signal light components with the multiple wavelengths $\lambda_1$ to $\lambda_N$ input from the first port. When signal light travels in a direction reverse to the above signal light traveling direction, the optical signal processing apparatus operates as an optical multiplexer which outputs from the first port signal light with the respective wavelengths input to the second or third port. The optical signal processing apparatus can change the wavelength of signal light to be demultiplexed or multiplexed in accordance with the polarized state of signal light with the wavelength $\lambda_n$ in the nth polarization control means. In addition, since the optical signal processing apparatus has no optical component which should be located on or removed from the optical path of signal light, a desired optical characteristic can stably be obtained.

In the optical signal processing apparatus according to the present invention, the first wavelength branch means preferably includes a diffraction grating element. The second wavelength branch means preferably includes a diffraction grating element. The third wavelength branch means preferably includes a diffraction grating element. The first wavelength branch means preferably includes a photonic crystal. The second wavelength branch means preferably includes a photonic crystal. The third wavelength branch means preferably includes a photonic crystal. The nth polarization control means preferably includes a Faraday rotation element. The polarized wave separation means preferably includes a polarization beam splitter. These are preferable in forming the above optical signal processing apparatus.

In the optical signal processing apparatus according to the present invention, the polarized wave separation means preferably outputs signal light of a polarized light component for which a wavelength branch efficiency by the first wavelength branch means is maximum to the first optical path and signal light of a polarized light component for which the wavelength branch efficiency by the first wavelength branch means is minimum to the second optical path. Since the optical path of signal light of the polarized light component for which the wavelength branch efficiency by the first wavelength branch means is maximum is separated from that of signal light of the polarized light component for which the wavelength branch efficiency is minimum by the polarized wave separation means, the optical signal processing apparatus can have an excellent optical characteristic.

The optical signal processing apparatus according to the present invention preferably further comprises polarization plane rotation means, arranged on one of the first and second optical paths, for equalizing the polarized states of the signal light components output from the polarized wave separation means and input to the second and third wavelength branch means. At this time, the polarization plane rotation means preferably includes a $\lambda/2$ plate. In addition, preferably, the polarized wave separation means outputs signal light of a polarized light component for which a wavelength branch efficiency by the first wavelength branch means is maximum to the first optical path and signal light of a polarized light component for which the wavelength branch efficiency by the first wavelength branch means is minimum to the second optical path, and the polarization plane rotation means is arranged on the second optical path. In this case, since the polarized states of signal light components which are output from the polarized wave separation means and input to the second and third wavelength branch means are equalized by the polarization plane rotation means, the second and third wavelength branch means can be integrated. In addition, the optical path of signal light of the polarized light component for which the wavelength branch efficiency by the first wavelength branch means is maximum is separated from that of signal light of the polarized light component for which the wavelength branch efficiency is minimum by the polarized wave separation means. The latter signal light component is converted into the polarized light component for which the wavelength branch efficiency is maximum. These polarized light components are input to the second and third wavelength branch means, respectively. Hence, the optical signal processing apparatus can have an excellent optical characteristic.

The optical signal processing apparatus according to the present invention preferably further comprises a first condenser lens which is arranged between the first wavelength branch means and the nth polarization control means to collimate the signal light components with the wavelengths $\lambda_n$ input from the first wavelength branch means and output the signal light components to the nth polarization control means. The apparatus preferably further comprises a second condenser lens which is arranged between the polarized wave separation means and the second wavelength branch means to focus the parallel signal light components with the wavelengths $\lambda_n$ input from the polarized wave separation means and output the signal light components to the second wavelength branch means. The apparatus preferably further comprises a third condenser lens which is arranged between the polarized wave separation means and the third wavelength branch means to focus the parallel signal light components with the wavelengths $\lambda_n$ input from the polarized wave separation means and output the signal light components to the third wavelength branch means. A focal length of the first condenser lens preferably equals that of the second condenser lens. A focal length of the first condenser lens preferably equals that of the third condenser lens. An optical path length between the first condenser lens and the second condenser lens preferably equals a sum of focal lengths of the first and second condenser lenses. An optical path length between the first condenser lens and the third condenser lens preferably equals a sum of focal lengths of the first and third condenser lenses. An optical path length between the first condenser lens and the nth polarization control means preferably equals the focal length of the first condenser lens. In this case, the coupling efficiency of light between the first and second ports is high, and the coupling efficiency of light between the first and third ports is high.

The optical signal processing apparatus according to the present invention preferably further comprises a polarizer which is arranged on an optical path between the first port and the first wavelength branch means to selectively pass light of a polarized light component for which a wavelength branch efficiency by the first wavelength branch means is maximum. The apparatus preferably further comprises a polarizer which is arranged on an optical path between the second port and the second wavelength branch means to selectively pass light of a polarized light component for which a wavelength branch efficiency by the second wavelength branch means is maximum. The apparatus preferably further comprises a polarizer which is arranged on an optical path between the third port and the third wavelength branch means to selectively pass light of a polarized light component for which a wavelength branch efficiency by the third wavelength branch means is maximum. In this case, the crosstalk between channels in the optical characteristic of the optical signal processing apparatus is reduced.

The optical signal processing apparatus according to the present invention preferably further comprises (1) first polarized wave separation means, arranged on an optical path between the first port and the first wavelength branch means, for separating the multi-wavelength signal light input from the first port into two polarized light components perpendicular to each other, (2) first polarization plane rotation means for converting each of the two polarized light components output from the first polarized wave separation means into a polarized light component for which a wavelength branch efficiency by the first wavelength branch means is maximum and inputting the polarized light component to the first wavelength branch means, (3) second polarized wave separation means, arranged on an optical path between the second port and the second wavelength branch means, for separating the multi-wavelength signal light input from the second port into two polarized light components perpendicular to each other, (4) second polarization plane rotation means for converting each of the two polarized light components output from the second polarized wave separation means into a polarized light component for which a wavelength branch efficiency by the second wavelength branch means is maximum and inputting the polarized light component to the second wavelength branch means, (5) third polarized wave separation means, arranged on an optical path between the third port and the third wavelength branch means, for separating the multi-wavelength signal light input from the third port into two polarized light components perpendicular to each other, and (6) third polarization plane rotation means for converting each of the two polarized light components output from the third polarized wave separation means into a polarized light component for which a wavelength branch efficiency by the third wavelength branch means is maximum and inputting the polarized light component to the third wavelength branch means.

In this case, in demultiplexing operation, the signal light with the multiple wavelengths input from the first port is converted by the first polarized wave separation means and first polarization plane rotation means into a polarized light component for which the wavelength branch efficiency by the first wavelength branch means is maximized and becomes incident on the first wavelength branch means. Each of the signal light components of the respective wavelengths, which should be output to the second port, is converted into a polarized light component for which the wavelength branch efficiency by the second wavelength branch means is maximized and becomes incident on the second wavelength branch means. The signal light components output from the second wavelength branch means are polarized and multiplexed by the second polarization plane rotation means and second polarized wave separation means and output to the second port. Each of the signal light components of the respective wavelengths, which should be output to the third port, is converted into a polarized light component for which the wavelength branch efficiency by the third wavelength branch means is maximized and becomes incident on the third wavelength branch means. The signal light components output from the third wavelength branch means are polarized and multiplexed by the third polarization plane rotation means and third polarized wave separation means and output to the third port. In multiplexing operation, signal light travels in a direction reverse to the above signal light traveling direction. Since signal light of a polarized light component for which the wavelength branch efficiency is maximum is input to each of the first, second, and third wavelength branch means, the crosstalk between channels is further reduced, and the insertion loss becomes small.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 1A is a view showing the arrangement of an optical signal processing apparatus 1 according to the first embodiment when viewed in parallel to the z-axis direction;

FIG. 1B is a view showing the arrangement of the optical signal processing apparatus 1 according to the first embodiment when viewed in parallel to the y-axis direction;

FIG. 2A is a view showing the azimuth of the plane of polarization and optical path at each position of signal light in the optical signal processing apparatus 1 according to the first embodiment when the rotation angle θ of the plane of polarization of signal light having a wavelength $\lambda_4$, which passes through a Faraday rotation element 34, is 0, and the polarized light component of the signal light that is input to the Faraday rotation element 34 has the first azimuth;

FIG. 2B is a view showing the azimuth of the plane of polarization and optical path at each position of signal light in the optical signal processing apparatus 1 according to the first embodiment when the rotation angle θ of the plane of polarization of signal light having the wavelength $\lambda_4$, which passes through the Faraday rotation element 34, is 0, and the polarized light component of the signal light that is input to the Faraday rotation element 34 has the second azimuth;

FIG. 2C is a view showing the azimuth of the plane of polarization and optical path at each position of signal light in the optical signal processing apparatus 1 according to the first embodiment when the rotation angle θ of the plane of polarization of signal light having the wavelength $\lambda_4$, which passes through the Faraday rotation element 34, is $\pi/2$, and the polarized light component of the signal light that is input to the Faraday rotation element 34 has the first azimuth;

FIG. 2D is a view showing the azimuth of the plane of polarization and optical path at each position of signal light in the optical signal processing apparatus 1 according to the first embodiment when the rotation angle θ of the plane of polarization of signal light having the wavelength $\lambda_4$, which passes through the Faraday rotation element 34, is $\lambda/2$, and the polarized light component of the signal light that is input to the Faraday rotation element 34 has the second azimuth;

FIG. 6 is view showing the arrangement of an optical signal processing apparatus 2 according to the second embodiment;

DETAILED DESCRIPTION OF THE PREFERRED EMBODIMENTS

Figure 3:
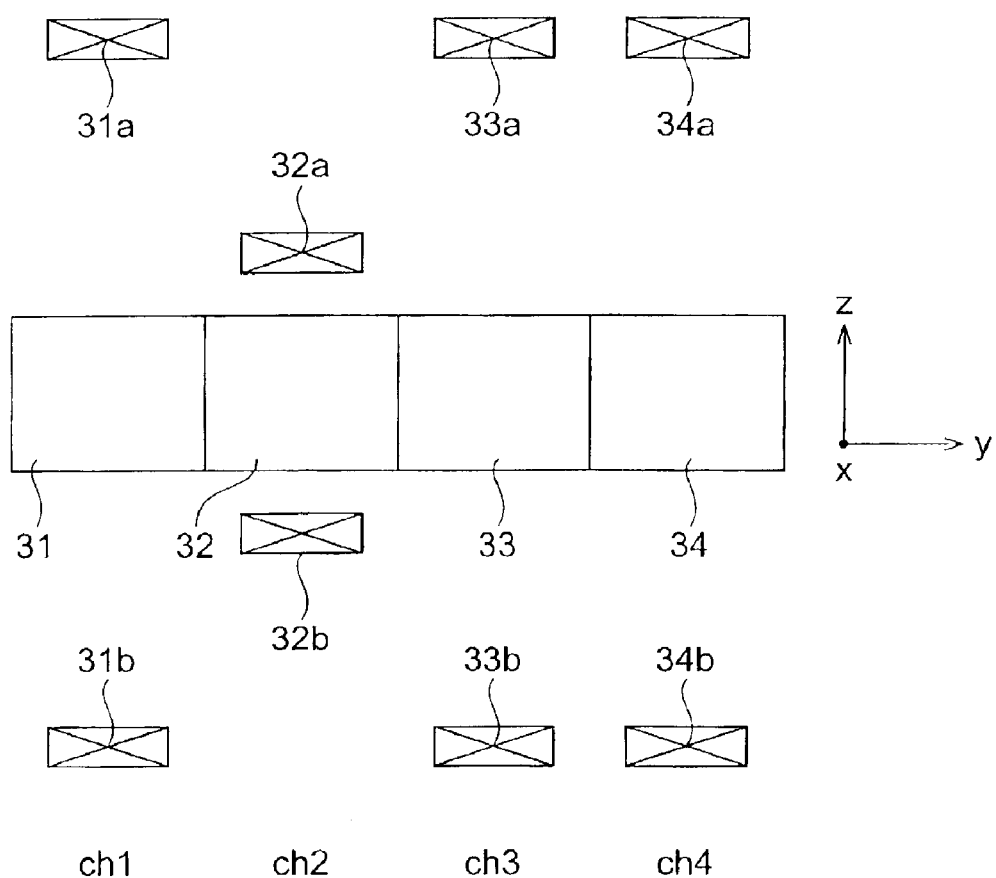
FIG. 3 is a view showing an arrangement of the Faraday rotation elements 31 to 34 of the optical signal processing apparatus 1 according to the first embodiment.

The embodiments of the present invention will be described below in detail with reference to the accompanying drawings. The same reference numerals denote the same elements throughout the drawings, and a repetitive description thereof will be omitted.

(First Embodiment)

An optical signal processing apparatus according to the first embodiment of the present invention will be described first. FIGS. 1A and 1B are views showing the arrangement of an optical signal processing apparatus 1 according to the first embodiment. FIGS. 1A and 1B show an x-y-z Cartesian coordinate system for the descriptive convenience. FIG. 1A shows the arrangement viewed in parallel to the z-axis direction. FIG. 1B shows the arrangement viewed in parallel to the y-axis direction. The optical signal processing apparatus 1 shown in FIGS. 1A and 1B can be used as a 4-channel optical multiplexer/demultiplexer. Each of four wavelengths $\lambda_1$ to $\lambda_4$ input from a first port $P_1$ (an end face of an optical fiber 81) is output from one of a second port $P_2$ (an end face of an optical fiber 82) and a third port $P_3$ (an end face of an optical fiber 83). In addition, signal light components of respective wavelengths input to the second port $P_2$ or third port $P_3$ are output from the first port $P_1$.

The optical signal processing apparatus 1 has, sequentially from the port $P_1$ to the ports $P_2$ and $P_3$, a diffraction grating element 11 serving as a first wavelength branch means, a first condenser lens 21, Faraday rotation elements 31 to 34 serving as a polarization control means, a polarization beam splitter 40 serving as a polarized wave separation means, a λ/2 plate 50 serving as a polarization plane rotation means, a second condenser lens 22, a third condenser lens 23, and a diffraction grating element 12 serving as second and third wavelength branch means. A collimator lens 91 is inserted between the port $P_1$ and the diffraction grating element 11. A collimator lens 92 is inserted between the port $P_2$ and the diffraction grating element 12. A collimator lens 93 is inserted between the port $P_3$ and the diffraction grating element 12.

The optical fiber 81 outputs, from its end face, multiplexed signal light that has propagated through the optical fiber 81 and reached the end face. The collimator lens 91 collimates and outputs the signal light having the four wavelengths $\lambda_1$ to $\lambda_4$, which is output from the end face of the optical fiber 81 and input to the port $P_1$. The collimated signal light travels in parallel to the x-y plane.

The diffraction grating element 11 is a transmission diffraction grating prepared by periodically forming gratings extending in the z-axis direction on one surface of a transparent flat plate. The diffraction grating element 11 receives the collimated signal light having the four wavelengths $\lambda_1$ to $\lambda_4$ and diffracts each signal light component at an angle corresponding to its wavelength. More specifically, the diffraction grating element 11 receives the multiplexed signal light having the four wavelengths $\lambda_1$ to $\lambda_4$, branches the multi-wavelength signal light into the respective wavelengths, and outputs the wavelength-branched signal light components of the respective wavelengths to spatially different optical paths. The diffracted signal light components of the respective wavelengths also travel in parallel to the x-y plane.

The first condenser lens 21 is arranged between the diffraction grating element 11 and the Faraday rotation elements 31 to 34. The first condenser lens 21 collimates the signal light components with the wavelengths $\lambda_1$ to $\lambda_4$ input from the diffraction grating element 11 and outputs the signal light components. The signal light components of the respective wavelengths collimated by the first condenser lens 21 travel in parallel to the x-axis direction.

Generally, the light diffraction efficiency in the diffraction grating element changes depending on the polarization azimuth of the incident light. The polarization azimuth at which the light diffraction efficiency in the diffraction grating element is high changes depending on the structure of the diffraction grating element. Hence, the diffraction efficiency in the diffraction grating element 11 changes between a polarized light component in the first azimuth parallel to the z-axis direction and a polarized light component in the second azimuth perpendicular to the first azimuth. The signal light components of the respective wavelengths output from the first condenser lens 21 mainly contain a polarized light component for which the diffraction efficiency in the diffraction grating element 11 is maximum. The following description will be made assuming that the diffraction efficiency for the polarized light component in the first azimuth is higher than that for the polarized light component in the second azimuth.

Each of the Faraday rotation elements 31 to 34 is made of, e.g., a YIG crystal. The Faraday rotation element controls the polarized state of input light on the basis of an applied magnetic field and outputs the light. Let F be the Verdet constant of the crystal of the Faraday rotation element, L be the optical path length of light that passes through the crystal, and H be the magnetic field component in the optical axis direction. A rotation angle θ of the plane of polarization of output light with respect to input light is given by $$\theta = FLH \tag{1}$$

As is apparent from equation (1), the rotation angle θ of the plane of polarization of light that passes through the crystal of the Faraday rotation element is proportional to the magnitude of the magnetic field H applied to the crystal and can therefore be controlled on the basis of an externally input control signal.

The magnitude of the magnetic field H of the Faraday rotation element 31 is controlled on the basis of an externally input control signal. The rotation angle θ is set to 0 or λ/2 in accordance with the magnitude of the magnetic field H. The Faraday rotation element 31 receives signal light having the wavelength $\lambda_1$ that has arrived from the first condenser lens 21 and outputs the signal light with the wavelength $\lambda_1$ as a polarized light component in the first azimuth (parallel to the z-axis direction) or second azimuth (parallel to the y-axis direction). Similarly, the Faraday rotation element 32 receives signal light having the wavelength $\lambda_2$ that has arrived from the first condenser lens 21 and outputs the signal light with the wavelength $\lambda_2$ as a polarized light component in the first or second azimuth. The Faraday rotation element 33 receives signal light having the wavelength $\lambda_3$ that has arrived from the first condenser lens 21 and outputs the signal light with the wavelength $\lambda_3$ as a polarized light component in the first or second azimuth. The Faraday rotation element 34 receives signal light having the wavelength $\lambda_4$ that has arrived from the first condenser lens 21 and outputs the signal light with the wavelength $\lambda_4$ as a polarized light component in the first or second azimuth.

The polarization beam splitter 40 receives the signal light components with the wavelengths $\lambda_1$ to $\lambda_4$ output from the Faraday rotation elements 31 to 34 and outputs each signal light component to one of two optical paths in accordance with the polarized state of the signal light component. More specifically, the polarization beam splitter 40 outputs signal light of a polarized light component in the first azimuth to the first optical path that is located on the same line as that of the incident light. However, the polarization beam splitter 40 outputs signal light of a polarized light component in the second azimuth to the second optical path that is located on a line shifted from the line of the incident light by a predetermined width in the z-axis direction.

The $\lambda/2$ plate 50 is arranged on the second optical path. The $\lambda/2$ plate 50 receives signal light of a polarized light component in the second azimuth, which is output from the polarization beam splitter 40 to the second optical path, rotates the plane of polarization of the signal light by $\pi/2$, and outputs the signal light as a polarized light component in the first azimuth. Accordingly, the polarized light component of each signal light component output from the $\lambda/2$ plate has the same azimuth as that of the polarized light component of each signal light component output from the polarization beam splitter 40 to the first optical path.

The focal length of each of the second condenser lens 22 and third condenser lens 23 preferably equals that of the first condenser lens 21. The second condenser lens 22 is arranged between the polarization beam splitter 40 and the diffraction grating element 12. The second condenser lens 22 focuses the signal light components of the respective wavelengths, which are input from the polarization beam splitter 40 and are parallel to each other, on the grating surface of the diffraction grating element 12. The third condenser lens 23 is arranged between the $\lambda/2$ plate 50 and the diffraction grating element 12. The third condenser lens 23 focuses the signal light components of the respective wavelengths, which are input from the $\lambda/2$ plate 50 and are parallel to each other, on the grating surface of the diffraction grating element 12.

The diffraction grating element 12 is a transmission diffraction grating prepared by periodically forming gratings extending in the z-axis direction on one surface of a transparent flat plate. The diffraction grating element 12 preferably has the same grating space as that of the diffraction grating element 11. The diffraction grating element 12 diffracts each signal light component at an angle corresponding to its wavelength. More specifically, the diffraction grating element 12 multiplexes the signal light components of the respective wavelengths, which have arrived from the second condenser lens 22, and outputs the multiplexed signal light to the collimator lens 92. The diffraction grating element 12 also multiplexes the signal light components of the respective wavelengths, which have arrived from the third condenser lens 23, and outputs the multiplexed signal light to the collimator lens 93.

The collimator lens 92 receives the signal light components of the respective wavelengths, which have arrived from the diffraction grating element 12, and focuses them on the end face of the optical fiber 82. The optical fiber 82 propagates the signal light that has become incident on the end face. The collimator lens 93 receives the signal light components of the respective wavelengths, which have arrived from the diffraction grating element 12, and focuses them on the end face of the optical fiber 83. The optical fiber 83 propagates the signal light that has become incident on the end face.

FIGS. 2A to 2D are explanatory views of the operations of the Faraday rotation element 34, polarization beam splitter 40, and $\lambda/2$ plate 50 of the optical signal processing apparatus 1 according to the first embodiment. The Faraday rotation element 34 will be described below. This also applies to the remaining Faraday rotation elements 31 to 33. FIGS. 2A to 2D show the arrangement viewed in parallel to the y-axis direction.

FIG. 2A is a view showing the azimuth of the plane of polarization and optical path at each position of signal light when the rotation angle $\theta$ of the plane of polarization of signal light having the wavelength $\lambda_4$, which passes through the Faraday rotation element 34, is 0, and the polarized light component of the signal light that is input to the Faraday rotation element 34 has the first azimuth. In this case, the signal light having the wavelength $\lambda_4$ still remains as the polarized light component in the first azimuth even when it is output from the Faraday rotation element 34. Hence, the signal light is output from the polarization beam splitter 40 to the first optical path and does not therefore pass through the $\lambda/2$ plate 50.

FIG. 2B is a view showing the azimuth of the plane of polarization and optical path at each position of signal light when the rotation angle $\theta$ of the plane of polarization of signal light having the wavelength $\lambda_4$, which passes through the Faraday rotation element 34, is 0, and the polarized light component of the signal light that is input to the Faraday rotation element 34 has the second azimuth. In this case, the signal light having the wavelength $\lambda_4$ still remains as the polarized light component in the second azimuth even when it is output from the Faraday rotation element 34. Hence, the signal light is output from the polarization beam splitter 40 to the second optical path (an optical path shifted from the first optical path in the z-axis direction) and therefore passes through the $\lambda/2$ plate 50. The signal light is converted into a polarized light component in the first azimuth by the $\lambda/2$ plate 50.

FIG. 2C is a view showing the azimuth of the plane of polarization and optical path at each position of signal light when the rotation angle $\theta$ of the plane of polarization of signal light having the wavelength $\lambda_4$, which passes through the Faraday rotation element 34, is $\pi/2$, and the polarized light component of the signal light that is input to the Faraday rotation element 34 has the first azimuth. In this case, the signal light having the wavelength $\lambda_4$ is converted into a polarized light component in the second azimuth by the Faraday rotation element 34. Hence, the signal light is output from the polarization beam splitter 40 to the second optical path and therefore passes through the $\lambda/2$ plate 50. The signal light is converted into a polarized light component in the first azimuth by the $\lambda/2$ plate 50.

FIG. 2D is a view showing the azimuth of the plane of polarization and optical path at each position of signal light when the rotation angle $\theta$ of the plane of polarization of signal light having the wavelength $\lambda_4$, which passes through the Faraday rotation element 34, is $\pi/2$, and the polarized light component of the signal light that is input to the Faraday rotation element 34 has the second azimuth. In this case, the signal light having the wavelength $\lambda_4$ is converted into a polarized light component in the first azimuth by the Faraday rotation element 34. Hence, the signal light is output from the polarization beam splitter 40 to the first optical path and does not therefore pass through the $\lambda/2$ plate 50.

As described above, the optical path to which each of the signal light components of the wavelengths $\lambda_1$ to $\lambda_4$ is to be output is switched depending on whether the rotation angle θ determined by the magnetic field applied to each of the Faraday rotation elements 31 to 34 is 0 or λ/2. Since all the signal light components of the wavelengths $\lambda_1$ to $\lambda_4$, which have passed through the λ/2 plate 50 on the second optical path, are polarized light components in the first azimuth, the diffraction efficiency in the diffraction grating element 12 is maximized.

FIG. 3 is a view showing an arrangement of the Faraday rotation elements 31 to 34 of the optical signal processing apparatus 1 according to the first embodiment. FIG. 3 shows an arrangement viewed in parallel to the x-axis direction. In the arrangement shown in FIG. 3, a pair of magnets 31a and 31b arranged on both sides of the Faraday rotation element 31 are movable in a direction parallel to the z-axis direction. The magnets 31a and 31b can move close to or apart from the Faraday rotation element 31. Accordingly, the magnetic field to be applied to the Faraday rotation element 31 can be changed. A pair of magnets 32a and 32b arranged on both sides of the Faraday rotation element 32 are movable in a direction parallel to the z-axis direction. The magnets 32a and 32b can move close to or apart from the Faraday rotation element 32. Accordingly, the magnetic field to be applied to the Faraday rotation element 32 can be changed. A pair of magnets 33a and 33b arranged on both sides of the Faraday rotation element 33 are movable in a direction parallel to the z-axis direction. The magnets 33a and 33b can move close to or apart from the Faraday rotation element 33. Accordingly, the magnetic field to be applied to the Faraday rotation element 33 can be changed. A pair of magnets 34a and 34b arranged on both sides of the Faraday rotation element 34 are movable in a direction parallel to the z-axis direction. The magnets 34a and 34b can move close to or apart from the Faraday rotation element 34. Accordingly, the magnetic field to be applied to the Faraday rotation element 34 can be changed. Referring to FIG. 3, for the Faraday rotation elements 31, 33, and 34, the corresponding magnets are separated from the Faraday rotation elements. The magnetic field applied is 0, and the rotation angle θ of the plane of polarization is 0. For the Faraday rotation element 32, the corresponding magnets 32a and 32b are near the Faraday rotation element 32. The magnetic field applied is large, and the rotation angle θ of the plane of polarization is π/2.

Figure 4:
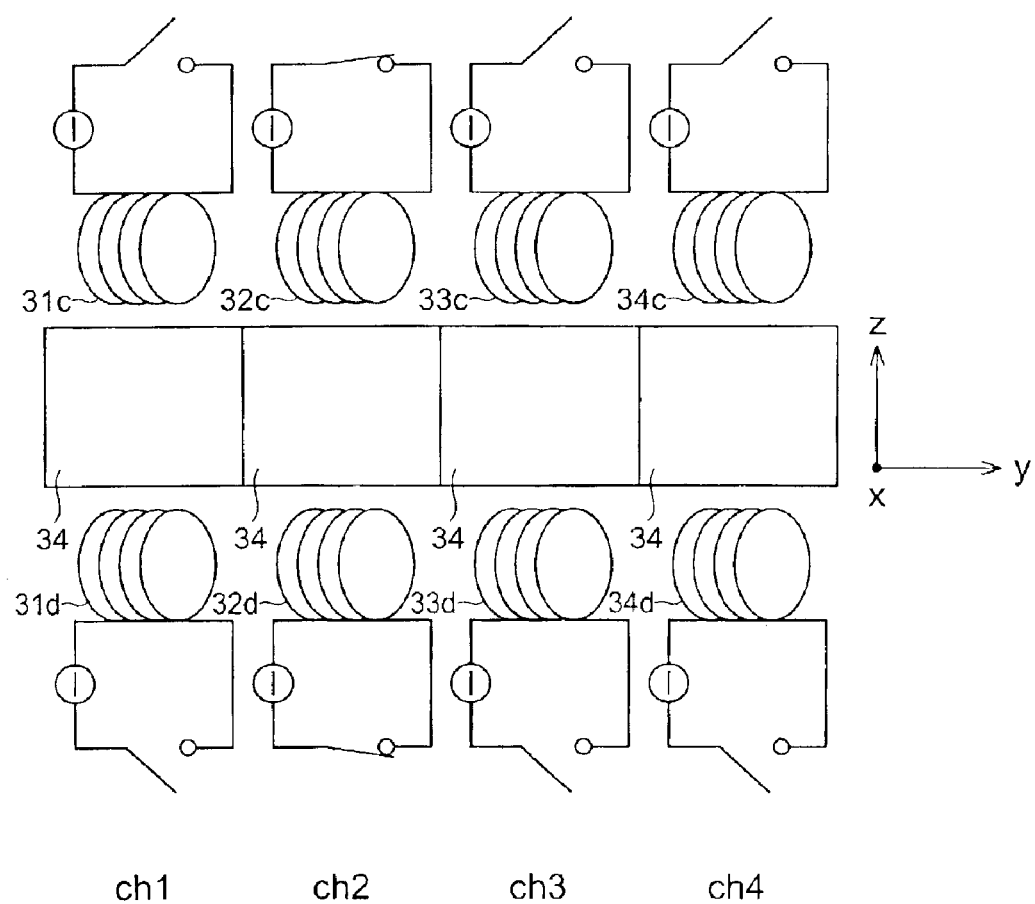
FIG. 4 is a view showing another arrangement of the Faraday rotation elements 31 to 34 of the optical signal processing apparatus 1 according to the first embodiment.

FIG. 4 is a view showing another arrangement of the Faraday rotation elements 31 to 34 of the optical signal processing apparatus 1 according to the first embodiment. FIG. 4 shows an arrangement viewed in parallel to the x-axis direction. In the arrangement shown in FIG. 4, each of a pair of electromagnets 31c and 31d arranged on both sides of the Faraday rotation element 31 can change the value of a current flowing through it. The magnetic field to be applied to the Faraday rotation element 31 can be changed in accordance with the current value. Each of a pair of electromagnets 32c and 32d arranged on both sides of the Faraday rotation element 32 can change the value of a current flowing through it. The magnetic field to be applied to the Faraday rotation element 32 can be changed in accordance with the current value. Each of a pair of electromagnets 33c and 33d arranged on both sides of the Faraday rotation element 33 can change the value of a current flowing through it. The magnetic field to be applied to the Faraday rotation element 33 can be changed in accordance with the current value. Each of a pair of electromagnets 34c and 34d arranged on both sides of the Faraday rotation element 34 can change the value of a current flowing through it. The magnetic field to be applied to the Faraday rotation element 34 can be changed in accordance with the current value. Referring to FIG. 4, for the Faraday rotation elements 31, 33, and 34, no current is supplied to the corresponding electromagnets. The magnetic field applied is 0, and the rotation angle θ of the plane of polarization is 0. For the Faraday rotation element 32, currents having predetermined values are supplied to the corresponding electromagnets 32c and 32d. The magnetic field applied is large, and the rotation angle θ of the plane of polarization is π/2.

In both of the arrangements shown in FIGS. 3 and 4, no movable member is present on the signal light propagation path. Hence, the optical signal processing apparatus can have excellent optical characteristics. Especially in the arrangement shown in FIG. 4, since the magnitude of the magnetic field to be applied to each of the Faraday rotation elements 31 to 34 can quickly be changed, the wavelength to be multiplexed or demultiplexed by the optical signal processing apparatus 1 can quickly be switched.

This optical signal processing apparatus 1 operates as an optical demultiplexer in the following way. Multiplexed signal light with the four wavelengths $\lambda_1$ to $\lambda_4$ which has propagated through the optical fiber 81, is output from the end face of the optical fiber 81, input to the port $P_1$ of the optical signal processing apparatus 1, and collimated by the collimator lens 91. The collimated signal light travels in parallel to the x-y plane and input to the diffraction grating element 11. The signal light components are diffracted by the diffraction surface of the diffraction grating element 11 at angles corresponding to the wavelengths, spatially separated into the respective wavelengths, and collimated by the first condenser lens 21. The collimated signal light components of the respective wavelengths travel in parallel to the x-axis direction.

The signal light component with the wavelength $\lambda_1$, which is output from the first condenser lens 21, is input to the Faraday rotation element 31. The signal light component with the wavelength $\lambda_2$ is input to the Faraday rotation element 32. The signal light component with the wavelength $\lambda_3$ is input to the Faraday rotation element 33. The signal light component with the wavelength $\lambda_4$ is input to the Faraday rotation element 34. For example, assume that no magnetic field is applied to the Faraday rotation elements 31, 33, and 34, and the rotation angle θ is 0. In addition, assume that a magnetic field is applied to the Faraday rotation element 32, and the rotation angle θ is π/2.

At this time, the signal light component with the wavelength $\lambda_1$, which is input to the Faraday rotation element 31, is output from the Faraday rotation element 31 in a polarized state while maintaining the plane of polarization at the time of input, sequentially passes through the polarization beam splitter 40 and second condenser lens 22, and is input to the diffraction grating element 12. This also applied to the signal light components with the wavelengths $\lambda_3$ and $\lambda_4$, which are input to the Faraday rotation elements 33 and 34. On the other hand, for the signal light component with the wavelength $\lambda_2$, which is input to the Faraday rotation element 32, is output from the Faraday rotation element 32 while rotating the plane of polarization at the time of input by π/2. The optical path is shifted in the z-axis direction by the polarization beam splitter 40. The plane of polarization is further rotated by π/2 by the λ/2 plate 50. Then, the signal light component is input to the diffraction grating element 12 through the third condenser lens 23.

The signal light components with the wavelengths $\lambda_1$, $\lambda_3$ and $\lambda_4$, which are focused on the diffraction surface of the diffraction grating element 12 through the second condenser lens 22, are diffracted by the diffraction surface and multiplexed. The multiplexed signal light with the wavelengths $\lambda_1$, $\lambda_3$ and $\lambda_4$ is condensed on the end face (port $P_2$) of the optical fiber 82 through the collimator lens 92, becomes incident from the end face on the optical fiber 82, and propagates through the optical fiber 82. On the other hand, the signal light component with the wavelength $\lambda_2$, which is focused on the diffraction surface of the diffraction grating element 12 through the third condenser lens 23, is diffracted by the diffraction surface and multiplexed. In this example, the signal light contains only one wavelength. In this case, the signal light with the single wavelength is diffracted. The signal light component with the wavelength $\lambda_2$ is focused on the end face (port $P_3$) of the optical fiber 83 through the collimator lens 93, becomes incident from the end face on the optical fiber 83, and propagates through the optical fiber 83.

In this way, the optical signal processing apparatus 1 receives the signal light with the four wavelengths $\lambda_1$ to $\lambda_4$ from the port $P_1$, branches the signal light, and outputs the branched signal light components with the wavelengths $\lambda_1$, $\lambda_3$ and $\lambda_4$ from the port $P_2$. Simultaneously, the optical signal processing apparatus 1 can output the remaining signal light component with the wavelength $\lambda_2$ from the port $P_3$. In addition, upon receiving the signal light components with the wavelengths $\lambda_1$, $\lambda_3$ and $\lambda_4$ from the port $P_2$ and the signal light component with the wavelength $\lambda_2$ from the port $P_3$, the optical signal processing apparatus 1 can multiplex the signal light components and output signal light with the four wavelengths $\lambda_1$ to $\lambda_4$ from the port $P_1$.

Figure 5A:
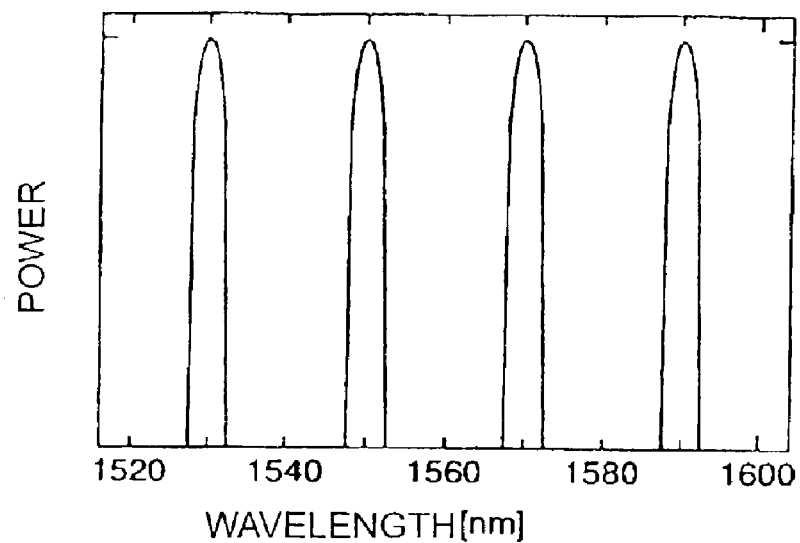
FIG. 5A is a graph showing the power distribution of light input to a port $P_1$ in the optical signal processing apparatus 1 according to the first embodiment.
Figure 5B:
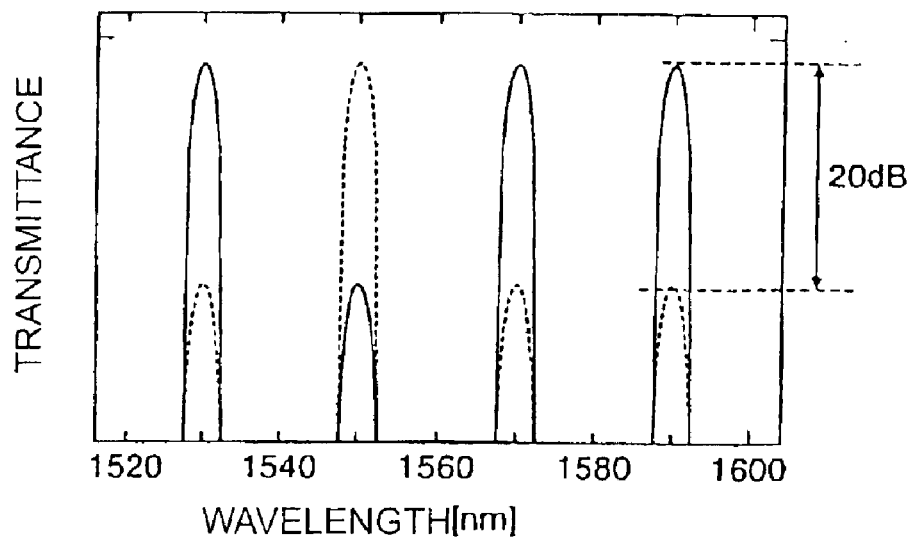
FIG. 5B is a graph showing the transmittance (solid line) of light output from a port $P_2$ and the transmittance (broken line) of light output from a port $P_3$ in the optical signal processing apparatus 1 according to the first embodiment.

FIGS. 5A and 5B are graphs showing the optical characteristics of the optical signal processing apparatus 1 according to the first embodiment. FIG. 5A shows the power distribution of light input to the port $P_1$. FIG. 5B shows the transmittance (solid line) of light output from the port $P_2$ and the transmittance (broken line) of light output from the port $P_3$. The four wavelengths $\lambda_1$ to $\lambda_4$ are 1530 nm, 1550 nm, 1570 nm, and 1590 nm, respectively. In addition, as shown in FIGS. 3 and 4, a magnetic field is applied to only the Faraday rotation element 32 such that the rotation angle $\theta$ of the plane of polarization of signal light with the wavelength $\lambda_2$ in the Faraday rotation element 32 becomes $\pi/2$. As shown in FIGS. 5A and 5B, the signal light components with the wavelengths $\lambda_1$, $\lambda_3$, and $\lambda_4$ are output from the port $P_2$, and the signal light component with the wavelength $\lambda_2$ is output from the port $P_3$. Although the signal light components with the wavelengths $\lambda_1$, $\lambda_3$, and $\lambda_4$ are slightly output from the port $P_3$, their powers are lower than those of the signal light components with the wavelengths $\lambda_1$, $\lambda_3$, and $\lambda_4$ output from the port $P_2$ by about 20 dB. On the other hand, although the signal light component with the wavelength $\lambda_2$ is slightly output from the port $P_2$, its power is lower than that of the signal light component with the wavelength $\lambda_2$ output from the port $P_3$ by about 20 dB.

As described above, the optical signal processing apparatus 1 can operate as both an optical demultiplexer and an optical multiplexer. The optical signal processing apparatus 1 can also operate as an optical ADM (Add Drop Multiplexer) which demultiplexes/multiplexes signal light. In addition, the optical signal processing apparatus 1 can change the wavelength of signal light to be input/output to/from the port $P_2$ or $P_3$ by adjusting the magnitude of the magnetic field to be applied to each of the Faraday rotation elements 31 to 34. In this case, since the optical signal processing apparatus 1 has no optical component which should be located on or removed from the optical path of signal light, a desired optical characteristic can stably be obtained.

In this optical signal processing apparatus 1, the grating space of the diffraction grating element 11 is preferably equal to that of the diffraction grating element 12. The condenser lenses 21 to 23 preferably have the same focal distance f. The optical path lengths between the condenser lens 21 and the condenser lens 22 and between the condenser lens 21 and the condenser lens 23 are preferably 2f. The optical path lengths between the Faraday rotation element 31 and the condenser lens 21, between the Faraday rotation element 32 and the condenser lens 21, between the Faraday rotation element 33 and the condenser lens 21, and between the Faraday rotation element 34 and the condenser lens 21 are preferably f. With this structure, the diffraction grating element 11 and condenser lens 21 are line-symmetrical to the diffraction grating element 12 and condenser lenses 22 and 23 with respect to the center line between them. Hence, the components can easily be laid out. In addition, the coupling efficiency of light between the port $P_1$ and the ports $P_2$ and $P_3$ is high. Furthermore, since the signal light beam size is minimized in each of the Faraday rotation elements 31 to 34, the efficiency of rotation of the plane of polarization of signal light in each of the Faraday rotation elements 31 to 34 becomes high.

(Second Embodiment)

An optical signal processing apparatus according to the second embodiment of the present invention will be described next. FIG. 6 is view showing the arrangement of an optical signal processing apparatus 2 according to the second embodiment. FIG. 6 shows the arrangement viewed in parallel to the z-axis direction. The optical signal processing apparatus 2 shown in FIG. 2 is obtained by inserting polarizers 61 and 62 to the optical signal processing apparatus 1 shown in FIGS. 1A and 1B. The polarizer 61 is arranged on the optical path between a port $P_1$ and a diffraction grating element 11 to selectively transmit light of a polarized light component for which the wavelength branch efficiency (diffraction efficiency) in the diffraction grating element 11 is maximum. The polarizer 62 is arranged on the optical path between ports $P_2$ and $P_3$ and a diffraction grating element 12 to selectively transmit light of a polarized light component for which the wavelength branch efficiency (diffraction efficiency) in the diffraction grating element 12 is maximum.

The optical signal processing apparatus 2 performs almost the same operation as that of the above-described optical signal processing apparatus 1. However, in demultiplexing operation, signal light that becomes incident from the port $P_1$ on the diffraction grating element 11 is mostly a polarized light component for which the wavelength branch efficiency (diffraction efficiency) in the diffraction grating element 11 is maximum due to the function of the polarizer 61. In multiplexing operation, signal light that becomes incident from the port $P_2$ or $P_3$ on the diffraction grating element 12 is mostly a polarized light component for which the wavelength branch efficiency (diffraction efficiency) in the diffraction grating element 12 is maximum due to the function of the polarizer 62.

Figure 7:
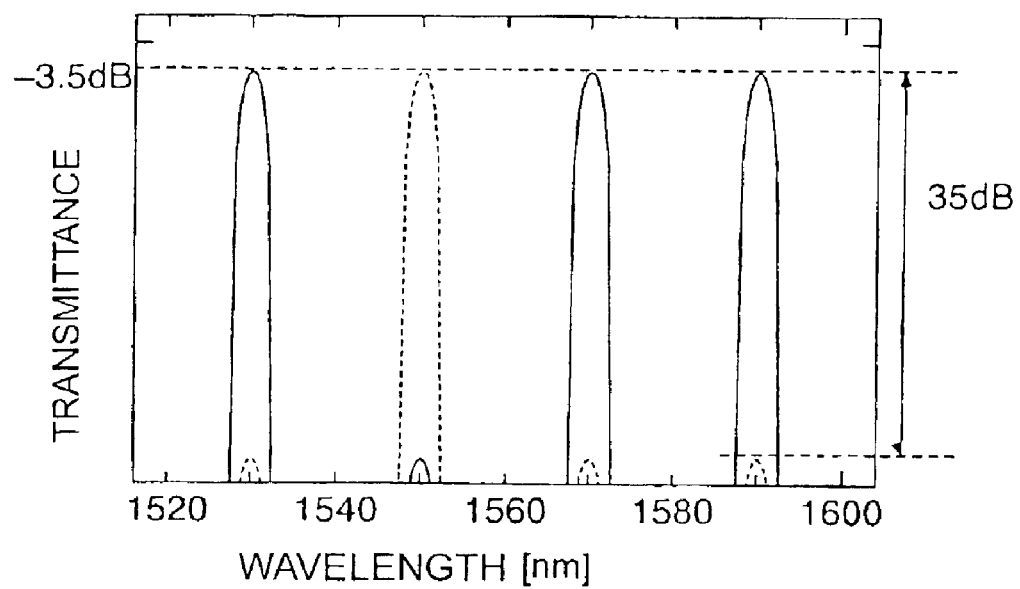
FIG. 7 is a graph showing the optical characteristic of the optical signal processing apparatus 2 according to the second embodiment.

FIG. 7 is a graph showing the optical characteristics of the optical signal processing apparatus 2 according to the second embodiment. FIG. 7 shows the transmittance (solid line) of light output from the port $P_2$ and the transmittance (broken line) of light output from the port $P_3$. Four wavelengths $\lambda_1$ to are 1530 nm, 1550 nm, 1570 nm, and 1590 nm, respectively. In addition, as shown in FIGS. 3 and 4, a magnetic field is applied to only a Faraday rotation element 32 such that a rotation angle $\theta$ of the plane of polarization of signal light with the wavelength $\lambda_2$ in the Faraday rotation element 32 becomes $\pi/2$. As shown in FIG. 7, the signal light components with the wavelengths $\lambda_1$, $\lambda_3$, and $\lambda_4$ are output from the port $P_2$, and the signal light component with the wavelength $\lambda_2$ is output from the port $P_3$. Although the signal light components with the wavelengths $\lambda_1$, $\lambda_3$, and $\lambda_4$ are slightly output from the port $P_3$, their powers are lower than those of the signal light components with the wavelengths $\lambda_1$, $\lambda_3$ and $\lambda_4$ output from the port $P_2$ by about 35 dB. On the other hand, although the signal light component with the wavelength $\lambda_2$ is slightly output from the port $P_2$, its power is lower than that of the signal light component with the wavelength $\lambda_2$ output from the port $P_3$ by about 35 dB. As compared to the optical characteristic (FIGS. 5A and 5B) of the optical signal processing apparatus 1 described above, the optical signal processing apparatus 2 has optical characteristics (FIG. 7) in which the crosstalk between channels is reduced.

(Third Embodiment)

Figure 8A:
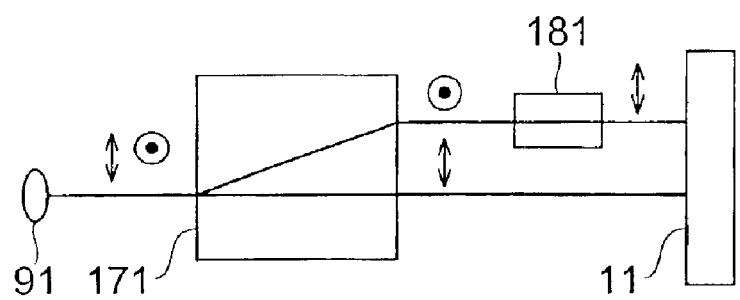
FIG. 8A is a view showing the arrangement of part of an optical signal processing apparatus 3 according to the third embodiment.
Figure 8B:
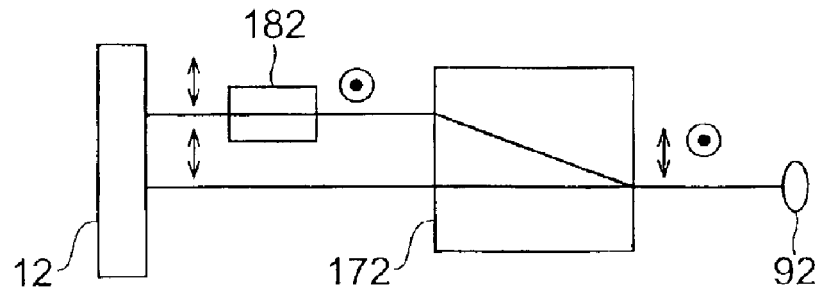
FIG. 8B is a view showing the arrangement of part of the optical signal processing apparatus 3 according to the third embodiment.

An optical signal processing apparatus according to the third embodiment of the present invention will be described next. FIGS. 8A and 8B are views showing the arrangement of part of an optical signal processing apparatus 3 according to the third embodiment. As shown in FIG. 8A, a polarization beam splitter 171 serving as a first polarized wave separation means and a $\lambda/2$ plate 181 serving as a first polarization plane rotation means are arranged between a collimator lens 91 and a diffraction grating element 11. As shown in FIG. 8B, a polarization beam splitter 172 serving as second and third polarized wave separation means and a $\lambda/2$ plate 182 serving as second and third polarization plane rotation means are arranged between collimator lenses 92 and 93 and a diffraction grating element 12.

In demultiplexing operation, the polarization beam splitter 171 separates multi-wavelength signal light that has arrived from the collimator lens 91 into two polarized light components that are perpendicular to each other. The $\lambda/2$ plate 181 receives one of the two polarized light components output from the polarization beam splitter 171 and rotates the plane of polarization of the light by $\pi/2$. Accordingly, all signal light components input to the diffraction grating elements 11 and 12 are polarized light components for which the wavelength branch efficiency (diffraction efficiency) in the diffraction grating elements 11 and 12 is maximum. The signal light components diffracted by the diffraction grating element 12 are polarized and multiplexed through the $\lambda/2$ plate 182 and polarization beam splitter 172 and become incident on optical fibers 82 and 83 through the collimator lenses 92 and 93.

In multiplexing operation, the polarization beam splitter 172 separates multi-wavelength signal light that has arrived from each of the collimator lenses 92 and 93 into two polarized light components that are perpendicular to each other. The $\lambda/2$ plate 182 receives one of the two polarized light components output from the polarization beam splitter 172 and rotates the plane of polarization of the light by $\pi/2$. Accordingly, all signal light components input to the diffraction grating elements 11 and 12 are polarized light components for which the wavelength branch efficiency (diffraction efficiency) in the diffraction grating elements 11 and 12 is maximum. The signal light components diffracted by the diffraction grating element 12 are polarized and multiplexed through the $\lambda/2$ plate 181 and polarization beam splitter 171 and become incident on an optical fiber 81 through the collimator lens 91.

Figure 9:
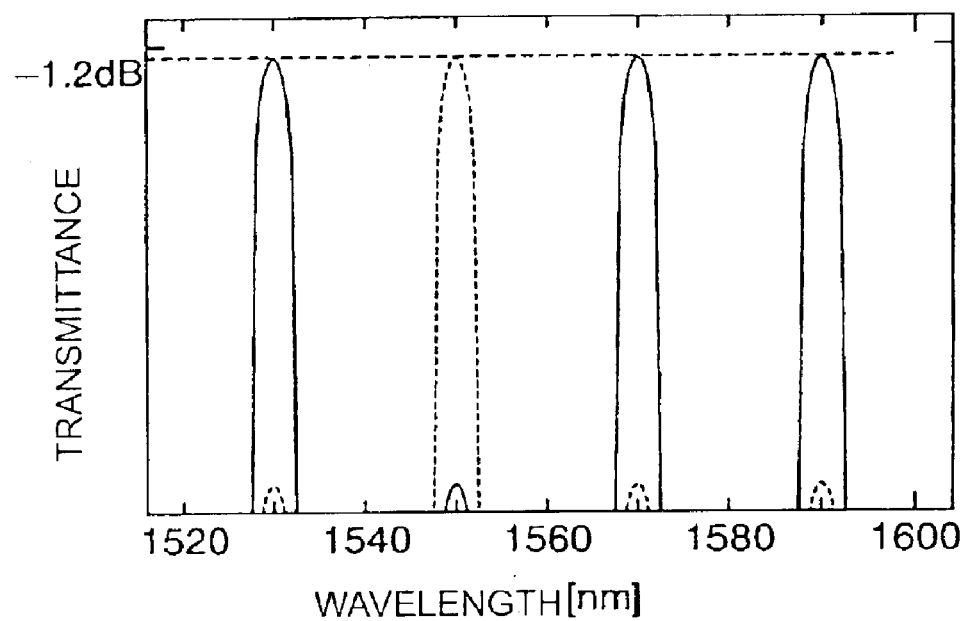
FIG. 9 is a graph showing the optical characteristic of the optical signal processing apparatus 3 according to the third embodiment.

FIG. 9 is a graph showing the optical characteristics of the optical signal processing apparatus 3 according to the third embodiment. FIG. 9 shows the transmittance (solid line) of light output from the port $P_2$ and the transmittance (broken line) of light output from the port $P_3$. Four wavelengths $\lambda_1$ to $\lambda_4$ are 1530 nm, 1550 nm, 1570 nm, and 1590 nm, respectively. In addition, as shown in FIGS. 3 and 4, a magnetic field is applied to only a Faraday rotation element 32 such that a rotation angle $\theta$ of the plane of polarization of signal light with the wavelength $\lambda_2$ in the Faraday rotation element 32 becomes $\pi/2$. As shown in FIG. 9, the signal light components with the wavelengths $\lambda_1$, $\lambda_3$, and $\lambda_4$ are output from the port $P_2$, and the signal light component with the wavelength $\lambda_2$ is output from the port $P_3$. Although the signal light components with the wavelengths $\lambda_1$, $\lambda_3$, and $\lambda_4$ are slightly output from the port $P_3$, their powers are much lower than those of the signal light components with the wavelengths $\lambda_1$, $\lambda_3$, and $\lambda_4$ output from the port $P_2$. On the other hand, although the signal light component with the wavelength $\lambda_2$ is slightly output from the port $P_2$, its power is much lower than that of the signal light component with the wavelength $\lambda_2$ output from the port $P_3$. As compared to the optical characteristic (FIG. 7) of the optical signal processing apparatus 2 described above, the optical signal processing apparatus 3 has an optical characteristic (FIG. 9) in which the crosstalk between channels is reduced, and the insertion loss is small.

(Modifications)

The present invention is not limited to the above embodiments, and various changes and modifications can be made. For example, in the above embodiments, the polarization beam splitter 40 and $\lambda/2$ plate 50 are common to the wavelengths. However, polarization beam splitters and $\lambda/2$ plates may independently be prepared for the respective wavelengths. In the above embodiments, the second collimator lens 92 and third collimator lens 93 are separated. However, they may be integrated. The diffraction grating element 12, polarizer 62, polarization beam splitter 172, and $\lambda/2$ plate 182 are common to the first and second optical paths. However, they may be prepared for each of the first and second optical paths.

The diffraction grating elements 11 and 12 are of a transmission type in the above embodiments. However, they may be of a reflection type. The polarization beam splitter 40 parallelly outputs two polarized light components, which are polarized and separated, in parallel to each other. However, the polarization beam splitter 40 may output the two polarized light components, which are polarized and separated, in directions perpendicular to each other. Alternatively, one of the polarized light components which are polarized and separated may be reflected by a reflecting mirror, and the two polarized light components may be output in parallel. A photonic crystal may be used in place of the diffraction grating elements 11 and 12 serving as wavelength branch means. Upon receiving multiplexed signal light with multiple wavelengths, the photonic crystal can output the signal light components of the respective wavelengths to spatially different optical paths in accordance with the wavelength. From this viewpoint, the photonic crystal has the same effect as that of the diffraction grating element.

As has been described above in detail, the optical signal processing apparatus according to the present invention can change the wavelength of signal light to be demultiplexed or multiplexed in accordance with the polarized state of signal light having a wavelength $\lambda_n$ in the nth polarization control means. In addition, since the optical signal processing apparatus has no optical component which should be located on or removed from the optical path of signal light, a desired optical characteristic can stably be obtained.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 2002-115057 filed on Apr. 17, 2002 is hereby incorporated by reference.

What is claimed is:

1. An optical signal processing apparatus which outputs from one of second and third ports each of multiple wavelengths $\lambda_1$ to $\lambda_N$ (N is an integer: $2 \leq N$) input from a first port and outputs from the first port signal light components of respective wavelengths input to the second port or third port, comprising:

first wavelength branch means for receiving signal light with the multiple wavelengths $\lambda_1$ to $\lambda_N$ input from the first port, branching the multi-wavelength signal light into the respective wavelengths, and outputting wavelength-branched signal light components of the respective wavelengths $\lambda_n$ (n is an integer: $2 \leq n \leq N$) to spatially different optical paths;

nth polarization control means for receiving the signal light components with the wavelengths $\lambda_n$ output from said first wavelength branch means, controlling a polarized state of each of the signal light components with the wavelengths $\lambda_n$ on the basis of an externally input control signal, and outputting the signal light components;

polarized wave separation means for receiving the signal light components with the wavelengths $\lambda_n$ output from said nth polarization control means and outputting the signal light components with the wavelengths $\lambda_n$ to one of first and second optical paths in accordance with the polarized state of each of the signal light components with the wavelengths $\lambda_n$;

second wavelength branch means for receiving the signal light components with the wavelengths $\lambda_n$ output from said polarized wave separation means to the first optical path, multiplexing the signal light components, and outputting the multiplexed signal light from the second port; and third wavelength branch means for receiving the signal light components with the wavelengths $\lambda_n$ output from said polarized wave separation means to the second optical path, multiplexing the signal light components, and outputting the multiplexed signal light from the third port.

2. An apparatus according to claim 1, wherein said first wavelength branch means includes a diffraction grating element.

3. An apparatus according to claim 1, wherein said second wavelength branch means includes a diffraction grating element.

4. An apparatus according to claim 1, wherein said third wavelength branch means includes a diffraction grating element.

5. An apparatus according to claim 1, wherein said nth polarization control means includes a Faraday rotation element.

6. An apparatus according to claim 1, wherein said polarized wave separation means includes a polarization beam splitter.

7. An apparatus according to claim 1, wherein said polarized wave separation means outputs signal light of a polarized light component for which a wavelength branch efficiency by said first wavelength branch means is maximum to the first optical path and signal light of a polarized light component for which the wavelength branch efficiency by said first wavelength branch means is minimum to the second optical path.

8. An apparatus according to claim 1, further comprising polarization plane rotation means, arranged on one of the first and second optical paths, for equalizing the polarized states of the signal light components output from said polarized wave separation means and input to said second and third wavelength branch means.

9. An apparatus according to claim 8, wherein said polarization plane rotation means includes a $\lambda/2$ plate.

10. An apparatus according to claim 8, wherein
    said polarized wave separation means outputs signal light of a polarized light component for which a wavelength branch efficiency by said first wavelength branch means is maximum to the first optical path and signal light of a polarized light component for which the wavelength branch efficiency by said first wavelength branch means is minimum to the second optical path, and
    said polarization plane rotation means is arranged on the second optical path.

11. An apparatus according to claim 1, further comprising a first condenser lens which is arranged between said first wavelength branch means and said nth polarization control means to collimate the signal light components with the wavelengths $\lambda_n$ input from said first wavelength branch means and output the signal light components to said nth polarization control means.

12. An apparatus according to claim 11, further comprising a second condenser lens which is arranged between said polarized wave separation means and said second wavelength branch means to focus the parallel signal light components with the wavelengths $\lambda_n$ input from said polarized wave separation means and output the signal light components to said second wavelength branch means.

13. An apparatus according to claim 11, further comprising a third condenser lens which is arranged between said polarized wave separation means and said third wavelength branch means to focus the parallel signal light components with the wavelengths $\lambda_n$ input from said polarized wave separation means and output the signal light components to said third wavelength branch means.

14. An apparatus according to claim 12, wherein a focal length of said first condenser lens equals that of said second condenser lens.

15. An apparatus according to claim 13, wherein a focal length of said first condenser lens equals that of said third condenser lens.

16. An apparatus according to claim 12, wherein an optical path length between said first condenser lens and said second condenser lens equals a sum of focal lengths of said first and second condenser lenses.

17. An apparatus according to claim 13, wherein an optical path length between said first condenser lens and said third condenser lens equals a sum of focal lengths of said first and third condenser lenses.

18. An apparatus according to claim 16, wherein an optical path length between said first condenser lens and said nth polarization control means equals the focal length of said first condenser lens.

19. An apparatus according to claim 1, further comprising a polarizer which is arranged on an optical path between the first port and said first wavelength branch means to selectively pass light of a polarized light component for which a wavelength branch efficiency by said first wavelength branch means is maximum.

20. An apparatus according to claim 1, further comprising a polarizer which is arranged on an optical path between the second port and said second wavelength branch means to selectively pass light of a polarized light component for which a wavelength branch efficiency by said second wavelength branch means is maximum.

21. An apparatus according to claim 1, further comprising a polarizer which is arranged on an optical path between the third port and said third wavelength branch means to selectively pass light of a polarized light component for which a wavelength branch efficiency by said third wavelength branch means is maximum.

22. An apparatus according to claim 1, further comprising
first polarized wave separation means, arranged on an optical path between the first port and said first wavelength branch means, for separating the multi-wavelength signal light input from the first port into two polarized light components perpendicular to each other,
first polarization plane rotation means for converting each of the two polarized light components output from said first polarized wave separation means into a polarized light component for which a wavelength branch efficiency by said first wavelength branch means is maximum and inputting the polarized light component to said first wavelength branch means,
second polarized wave separation means, arranged on an optical path between the second port and said second wavelength branch means, for separating the multi-wavelength signal light input from the second port into two polarized light components perpendicular to each other,
second polarization plane rotation means for converting each of the two polarized light components output from said second polarized wave separation means into a polarized light component for which a wavelength branch efficiency by said second wavelength branch means is maximum and inputting the polarized light component to said second wavelength branch means,
third polarized wave separation means, arranged on an optical path between the third port and said third wavelength branch means, for separating the multi-wavelength signal light input from the third port into two polarized light components perpendicular to each other, and
third polarization plane rotation means for converting each of the two polarized light components output from said third polarized wave separation means into a polarized light component for which a wavelength branch efficiency by said third wavelength branch means is maximum and inputting the polarized light component to said third wavelength branch means.

23. An apparatus according to claim 1, wherein said first wavelength branch means includes a photonic crystal.

24. An apparatus according to claim 1, wherein said second wavelength branch means includes a photonic crystal.

25. An apparatus according to claim 1, wherein said third wavelength branch means includes a photonic crystal.

* * * * *